March 6, 1945. E. L. ALLEN ET AL 2,371,015
TREAD BLOCK CORES FOR ENDLESS TRACKS AND THE LIKE
Original Filed Jan. 14, 1942
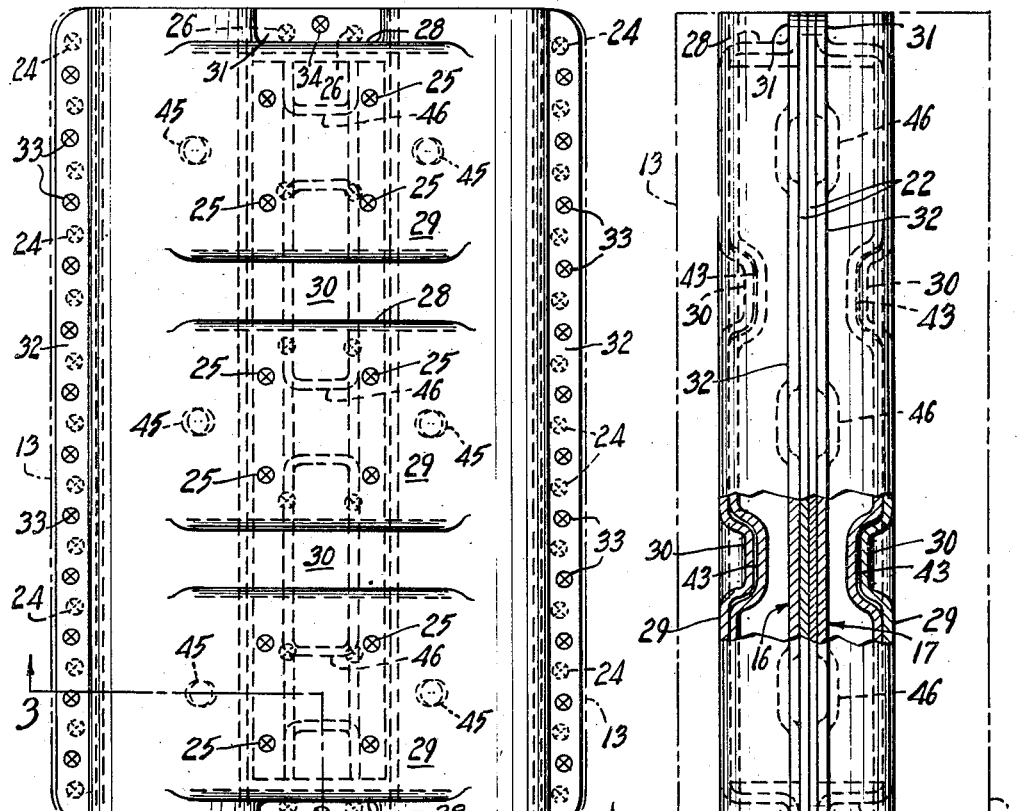
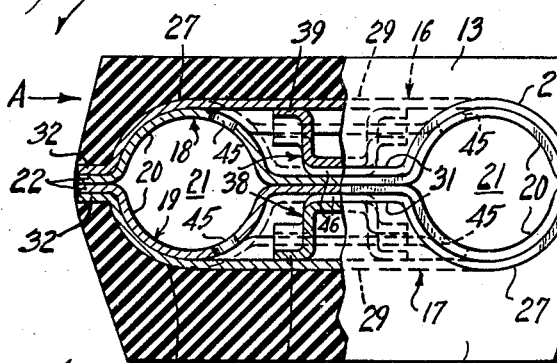
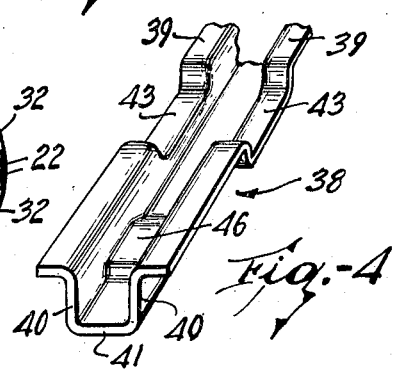
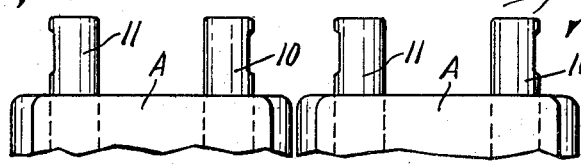
INVENTORS
EDWIN L. ALLEN
HAROLD B. MUSTER
BY Hyde and Meyer
ATTORNEYS Patented Mar. 6, 1945

2,371,015

UNITED STATES PATENT OFFICE 2,371,015

TREAD BLOCK CORE FOR ENDLESS TRACKS AND THE LIKE

Edwin L. Allen, Cleveland Heights, and Harold B. Muster, Avon Lake, Ohio, assignors to Rudolph I. Schonitzer, Shaker Heights, Ohio Original application January 14, 1942, Serial No. 426,666. Divided and this application February 1, 1944, Serial No. 520,600

3 Claims. (Cl. 305—10)

This invention relates to endless tracks for vehicles such as tanks, tractors and the like. More particularly, the present invention relates to improvements in the re-enforcing cores of rubber tread blocks for such tracks.

The type of tread block core with which the present invention is concerned is one having generally cylindrical passageways adjacent, and substantially parallel with, the front and rear core edges for the extension therethrough of cross rods by means of which a set of tread blocks, containing cores of the character here involved, may be connected to form an endless track, the laterally projecting end portions of the cross rods being provided, on each side of the track, with suitable means (not here involved and not here shown) which not only maintain the tread blocks in assembled track-forming relationship but which also cooperate in the driving and the guiding of the track.

For the formation of track tread blocks, cores of the character here involved have layers of rubber bonded to opposite faces thereof, and the general object of the present invention is the provision of a core which is of such strong and sturdy construction as to enable the tread block of which it forms a part to withstand the severe abuse to which it is subjected in use in endless tracks, particularly in the endless tracks of heavy armored tanks and the like.

A more specific object of the present invention is the provision of tread block cores which are made of simple and inexpensive sheet metal parts, portions of which are constructed to provide cylindrical passageways transversely through the tread blocks for the reception of the aforesaid cross rods, and which sheet metal cores, although of relatively light weight, have surprisingly great strength, rigidity and ruggedness for the effective re-enforcement of the layers of rubber which are bonded to their opposite faces.

Another more specific object of the present invention is the provision of a sheet metal core for a tread block of the type which extends completely across the track in which it is used, said core having simple and inexpensive sheet metal reenforcing members so constructed and arranged as to materially add to the strength, rigidity and ruggedness of the core as a whole.

Another more specific object of the present invention is the provision of a tread block core having (a) a pair of interior sheet metal members shaped to provide the core with transverse and generally cylindrical passageways adjacent its front and rear edges; (b) a pair of exterior sheet metal members, one associated with each interior core member, and having portions thereof in contact with and other portions thereof spaced from its associated interior core member; and (c) sheet metal reenforcing members of channel form arranged in the spaces between said interior and exterior core members, said reenforcing members lying between and being generally parallel with the front and rear passageways formed by the interior core members.

Further objects of the present invention, and its practical advantages, will be referred to in or will be evident from the following description of a tread block core embodying the invention, said core being illustrated in the accompanying drawing, in which Fig. 1 is a top plan view of the tread block core here illustrated for the disclosure of the present invention, said core being of the type for use in a tread block extending completely across the track in which it is used, the front and rear edges of the layers of rubber which are bonded to opposite faces of said core to form such tread block being indicated in dot-dash lines.

Fig. 2 is a front elevational view of such core, with portions broken away to show inside construction, the outer peripheries of the layers of rubber which are bonded to opposite faces of the core for the formation of a tread block being indicated in dot-dash lines;

Fig. 3 is a view of a tread block containing the core of Figs. 1 and 2, the view being partly in vertical section and partly in side elevation on the line 3—3 of Fig. 1;

Fig. 4 is a fragmentary perspective view of one of the channel-shaped sheet metal re-enforcing members of the core; and Fig. 5 is a top plan view of end portions of two adjacent tread blocks containing cores of the character here involved, the tread blocks being in endless track relationship but with the projecting end portions of their cross rods unconnected.

Before the herein illustrated tread block core is specifically described, it is to be understood that the invention here involved is not limited to the structural details or the arrangement of parts here illustrated or described, as tread block cores embodying the invention obviously may take other forms. It also is to be understood that the phraseology or terminology herein employed is for purposes of description and not of limitation, the scope of the present invention being denoted by the appended claims.

Although cores embodying the invention here involved may be used in tread blocks of the type which are longitudinally disposed in a plurality of side-by-side rows to form an endless track, with the blocks of each row in staggered relation relative to the blocks of the neighboring row or rows, the present improved cores are particularly suitable for use in tread blocks of the type which extend completely across the track in which they are used, the cores having sufficient strength, rigidity and ruggedness for use in such transversely disposed tread blocks.

Merely for purposes of illustration, therefore, the core here shown is for use in a tread block A of full track width, and as the core extends completely across the block, it also is of full track width. To form an endless track from such blocks, a series of these blocks are connected at the sides of the track in an endless row, as indicated in Fig. 5, the projecting end portions of the transversely disposed front cross rod 10 of each block A being connected by means not here shown to the projecting end portions of the transversely disposed rear cross rod 11 of the preceding tread block A, as will be readily understood.

As best shown in Fig. 3, each tread block A is formed by suitably bonding to the inner and outer faces of a core of the character here involved layers of rubber 13 and 14, the outer or ground-engaging layer of rubber 14 usually having a somewhat greater thickness than that of the inner layer of rubber 13, as here shown. The core of each block is thus sandwiched between two layers of rubber, the core and the rubber layers being coextensive in width as well as in length.

As will be evident from the accompanying drawing, particularly from Figs. 1 to 3 thereof, the present improved core includes four simple and inexpensive sheet metal members of generally rectangular form in plan view. These four core members may, and here do, have the same width and length, and they are assembled in stacked relationship, one above another, in a unitary structure, with their peripheries in alignment, as clearly shown in Figs. 2 and 3. Inasmuch as this assembled set of core members has the same length and the same width as the two layers of rubber 13 and 14 which are bonded to the inner and outer faces thereof, the layers of rubber are effectively re-enforced throughout their entire area. For manufacturing economy and simplicity of assembly, the two exterior core members 16 and 17 are preferably identical and therefore interchangeable. Similarly, the two interior core members 18 and 19 are preferably identical and thus interchangeable, although it is to be understood that these members of the core may differ, if desired, one from another.

As best shown in Figs. 1 and 3, each of the two interior core members 18 and 19 is provided adjacent each of its front and rear edge flanges with a transversely disposed semi-cylindrical corrugation 20. As a result, when the two interior core members are assembled in superposed relation, with their corrugations oppositely disposed and matching, two transverse passageways 21 of cylindrical form are provided, one for the reception of a front cross rod 10 and the other for the reception of a rear cross rod 11. If desired, the diameter of the core passageways 21 thus formed may be somewhat greater than that of the cross rods 10 and 11 in order that such passageways may be provided with rubber linings or the like or the intermediate portions of the cross rods provided with rubber coverings or the like, although obviously, said passageways may be made of such size as to just receive said cross rods, as will be readily understood.

As here shown, welding is used to unite the two interior core members 18 and 19 in superposed relation, the character of the welding and the location of the welded areas being such as to securely and effectively unite said members. Preferably, these interior core members are welded to each other along their overlapping front and rear edge flanges 22 and along their overlapping middle portions between and adjacent the corrugations 20. For the connection by welding of the two interior core members, the front and rear edge flanges of each such member are here provided with transversely spaced welding projections 24, and the middle portion of each such core member is provided with two rows of transversely spaced welding projections 25, one row alongside each of the corrugations 20. The welding projections 24 and 25 of each interior core member extend in the direction opposite to that of the corrugations 20, and when the two interior core members are first assembled in superposed relationship, they are of course spaced apart by these welding projections.

In order to space the welding projections of one interior core member from the corresponding welding projections of the other, inasmuch as the two interior core members here shown are of duplicate form, and to properly distribute the welded areas, each such interior core member has its two sets of welding projections 24 suitably staggered, with a corresponding staggering of its two sets of welding projections 25. As here shown, each interior core member has one of its edge flanges provided with a row of six welding projections 24 and its other edge flange provided with a row of seven welding projections 24. As to its welding projections 25, each of the interior core members is here shown as having three such projections in each of its two rows thereof. The two interior core members are so assembled that unlike edge flanges are brought together, the "six projection" flange of one member lying opposite the "seven projection" flange of the other. The transverse spacing of the welding projections 24 and 25 of each interior core member is such that when these two core members are thus assembled, there is a row of thirteen transversely spaced welding projections 24 between each pair of contacting edge flanges and two rows of six transversely spaced welding projections 25 between the contacting middle portions of these core members.

The type of welding preferably used for the uniting of these interior core members is the well known resistance welding, the welding projections 24 and 25 being melted in the welding operation by the heat caused by the resistance of the electric current. The two interior core members are thus united in a particularly effective and durable manner.

As indicated in Fig. 1, the welding projections 24 and 25 not only are spaced entirely across the interior core members 18 and 19 but are located as closely as possible to the corrugations 20, the effect of which is to minimize any tendency of these two core members to separate or become disconnected even under severe conditions of use. If desired and as here shown, the side (or end) edges of the middle portions of the two interior core members, between their corrugations 20, also may be united by welding, and for such purpose, a welding projection 26 is here provided in each such side (or end) edge. As a result, the two interior core members are united, at each of their two side (or end) edges, by means of two such welding projections 26, as clearly shown in Fig. 1.

As best shown in Fig. 3, the two exterior core members 16 and 17 (the top and bottom core members, as they appear in this view) also are provided adjacent their front and rear edge flanges with transversely disposed corrugations of semi-cylindrical form, the corrugations 27 of such exterior core members fitting over the corresponding corrugations 20 of the two interior core members when the exterior core members are assembled therewith on opposite faces thereof. For strengthening and therefore re-enforcing purposes, each of the two exterior core members (such members being of duplicate form, as heretofore pointed out) is provided between its two transverse corrugations 27 with a centrally disposed rib 28 of generally channel-shaped cross section. As shown in Figs. 1 and 3, the ends of the rib 28 of each exterior core member merge with the side walls of the corrugations 27 thereof, the top wall 29 of such rib (except for channels therein if they are used) being substantially flush with the tops of such corrugations. As a result of this bridging of the two transverse corrugations 27 of each of the exterior core members, the layers of rubber 13 and 14 are effectively re-enforced between the core corrugations. If desired, the top wall 29 of each of the ribs 28 may be provided with one or more channels extending from one corrugation 27 to the other, there being two such channels 30, transversely spaced, in the top wall of each rib 28, as here shown. These channels 30 in the ribs 28 not only strengthen the exterior core members, and thus the core as a whole, but also aid in the bonding of the layers of rubber to the core, as will be readily understood.

As will be evident from Figs. 1 and 2, the two exterior core members 16 and 17 are each provided, on opposite sides of its rib 28 and between its transverse corrugations 27, with flat side (or end) edge portions 31, which contact the middle portions of the interior core members 18 and 19 adjacent their side (or end) edges when the exterior and interior core members are assembled in superposed or stacked relationship. As a result of the provision of the ribs 28, the core is of box-like section and hence, is of exceptionally strong and rugged character. The provision of the ribs 28 of the exterior core members also is of material assistance in the transverse anchoring of the layers of rubber 13 and 14, inasmuch as the side (or end) portions of said layers extend around such ribs, as indicated by Fig. 2. As the layers of rubber also extend around the core corrugations to the front and rear core flanges, an effective anchoring of such layers in a front and rear direction similarly is achieved. To bond or bring about a secure adherence of the layers of rubber to the inner and outer faces of the core, any suitable means may be utilized, such as the copper plating of the exposed faces of the exterior core members, for example.

Inasmuch as the exterior core members 16 and 17 are of duplicate form, no special care need be exercised in assembling them with the two interior core members 18 and 19, on opposite faces thereof. To secure the exterior core members to the interior core members, resistance welding is here utilized, and for that purpose, the front and rear edge flanges 32 of the exterior core members, and the flat side (or end) edge portions 31 thereof, are provided with welding projections. As here shown, there are twelve welding projections 33 spaced in a row along each of the edge flanges 32 of each exterior core member and a single welding projection 34 in each of its side (or end) edge portions 31. In the welding operation, the welding projections 33 and 34 are melted, and the exterior core members thus caused to be rigidly and firmly united to the two interior core members on opposite faces thereof. As will be evident from Fig. 1, each edge flange 32 has its welding projections 33 staggered with respect to the welding projections 24 thereof, with the row of welding projections 33 of each flange disposed between the row of welding projections 24 thereof and the free edge of the flange. It also will be evident from Fig. 1 that the welding projections 34 in the side (or end) edge portions 31 are staggered with respect to the welding projections 26 of the interior core members, each welding projection 34 being here disposed between two welding projections 26.

To increase their strength, rigidity and ruggedness, cores embodying the present invention include, in addition to the generally rectangular interior and exterior core members heretofore described, special re-enforcing members which are, of course, of material advantage in cores which are of full back width, such as the core here illustrated.

As will be evident from the accompanying drawing, there are two such special re-enforcing members in the present core, said members being in the form of sheet metal channels 38 (see Figs. 3 and 4) having outturned flanges 39 at the free longitudinal edges of their side walls 40. For manufacturing economy and simplicity of assembly, these channel-shaped re-enforcing members may be, and here are, of duplicate character.

As best shown in Fig. 3, one of these re-enforcing channels 38 is arranged between each interior core member and its associated or adjacent exterior core member. More specifically, there is a re-enforcing channel between the middle portion of each interior core member and the rib 28 of the associated exterior core member, the two channels lying within the ribs 28, in substantially parallel relation with the core corrugations, with the channel bases 41 in contact with the middle portions of the interior core members and the channel flanges 39 in contact with the top walls 29 of the ribs.

To receive the transversely spaced channels 30 in the top walls 29 of the ribs 28 of the exterior core members 16 and 17, the outturned flanges 39 and the side walls 40 of the channel-shaped re-enforcing members 38 are provided with transversely spaced depressions 43, as best shown in Figs. 2 and 4, and inasmuch as each of the ribs 28 has two channels 30 in its top wall, each of the channel-shaped re-enforcing members has two sets of transversely spaced depressions 43 in its flanges and side walls. As here shown (see Figs. 1 and 2), the channel-shaped re-enforcing members 38 are of such length as to more or less snugly fit within the ribs 28 of the exterior core members, but inasmuch as said re-enforcing members are interlocked with the channels 30 in the top walls of said ribs, endwise movement of said re-enforcing members would not occur even if their length were reduced.

As heretofore pointed out, the exposed faces of the two exterior core members may be copper plated to enable the rubber layers 13 and 14 to be bonded thereto, the layer of rubber 13 being bonded to the exposed face of the exterior core member 16 and the thicker, ground-engaging layer of rubber being bonded to the exposed face of the exterior core member 17. In the copper plating of said core faces, which takes place after the core is formed, the use of several solutions is necessary, and in order to avoid any liability of the commingling of such solutions, by the travel of the core from one solution to the next, the present core is provided with both drainage apertures and drainage passageways.

As here shown, each of the corrugations 20 of each of the interior core members is provided with three transversely spaced apertures 45 for the drainage of the channel-shaped ribs 28 of the exterior core members 16 and 17. Drainage passageways 46 also are provided across the bases 41 of the channel-shaped re-enforcing members 38, said passageways being transversely spaced and being here shown as in alignment with the drainage apertures 45. As will be readily understood, these passageways 46 establish communication between those portions of the hollow of each rib lying on opposite sides of the channel-shaped re-enforcing member therein, so that the hollows of the ribs are quickly and completely drained.

To those skilled in the art to which the present invention relates, further features and advantages of tread block cores embodying such invention will be evident from the foregoing description of one such core.

The present application is a division of application Serial No. 426,666, filed January 14, 1942, jointly by us and Rudolph I. Schonitzer. Inasmuch as such application Serial No. 426,666 contained when filed subject matter jointly invented by us, and subject matter solely invented by Mr. Schonitzer, the present application is being filed for the subject matter constituting our joint invention. The aforesaid application Serial No. 426,666 is being limited to the subject matter solely invented by Mr. Schonitzer and is being converted to a sole application in his name.

What we claim is:

1. A core for the rubber tread block of an endless track of the type in which the tread blocks of such track have cross rods extending therethrough, said core comprising a pair of inner sheet metal core members rigidly connected in stacked relation and provided in the region of each of the front and rear edges thereof with a pair of oppositely extending matching corrugations coextensive with the length of such edges, each pair of such matching corrugations providing a passageway between said inner core members for a track cross rod, a pair of outer sheet metal core members rigidly connected with said inner core members and disposed on opposite faces thereof, portions of said outer core members being spaced from opposed portions of said inner core members, and a pair of sheet metal core members engaging said inner core members and said outer core members and located in the spaces between the aforesaid portions thereof.

2. A core for the rubber tread block of an endless track of the type in which the tread blocks of such track have cross rods extending therethrough, said core comprising a pair of inner sheet metal core members rigidly connected in stacked relation and provided in the region of each of the front and rear edges thereof with a pair of oppositely extending matching corrugations coextensive with the length of such edges, each pair of such matching corrugations providing a passageway between said inner core members for a track cross rod, a pair of outer sheet metal core members rigidly connected with said inner core members and disposed on opposite faces thereof, portions of said outer core members being spaced from opposed portions of said inner core members, and a pair of channel shaped sheet metal core members engaging said inner core members and said outer core members and located in the spaces between the aforesaid portions thereof.

3. A core for the rubber tread block of an endless track of the type in which the tread blocks of such track have cross rods extending therethrough, said core comprising a pair of inner sheet metal core members rigidly connected in stacked relation and provided in the region of each of the front and rear edges thereof with a pair of oppositely extending matching corrugations coextensive with the length of such edges, each pair of such matching corrugations providing a passageway between said inner core members for a track cross rod, a pair of outer sheet metal core members rigidly connected with said inner core members and disposed on opposite faces thereof, portions of said inner core members between the pair of corrugations thereof being spaced from opposed and channeled portions of said outer core members, and a pair of channel shaped sheet metal core members engaging said inner core members and said outer core members and located in the spaces between the aforesaid portions thereof, said channel shaped core members being provided with depressions for the reception of the channels of the aforesaid portions of said outer core members.

EDWIN L. ALLEN.
HAROLD B. MUSTER.